United States Patent
Gaur et al.

(10) Patent No.: US 9,014,115 B2
(45) Date of Patent: Apr. 21, 2015

(54) METHOD AND APPARATUS FOR HANDLING DOWNLINK REFERENCE SIGNAL INTERFERENCE TO PDSCH IN LONG TERM EVOLUTION COORDINATED MULTIPOINT TRANSMISSION

(71) Applicant: Hitachi, Ltd., Tokyo (JP)

(72) Inventors: Sudhanshu Gaur, Santa Clara, CA (US); Long Gao, Santa Clara, CA (US); Joydeep Acharya, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 53 days.

(21) Appl. No.: 13/684,327

(22) Filed: Nov. 23, 2012

(65) Prior Publication Data

US 2014/0146689 A1    May 29, 2014

(51) Int. Cl.
*H04W 72/08*  (2009.01)
*H04J 11/00*  (2006.01)
*H04L 5/00*  (2006.01)

(52) U.S. Cl.
CPC ......... *H04W 72/082* (2013.01); *H04J 11/0053* (2013.01); *H04J 11/0056* (2013.01); *H04L 5/0073* (2013.01)

(58) Field of Classification Search
CPC .............. H04W 72/082; H04J 11/0053; H04J 11/0056; H04J 11/0073; H04L 5/0073
USPC ................... 370/329; 455/450–454
See application file for complete search history.

(56) References Cited

U.S. PATENT DOCUMENTS

| | | | |
|---|---|---|---|
| 2011/0199986 A1* | 8/2011 | Fong et al. | 370/329 |
| 2012/0082082 A1* | 4/2012 | Etemad et al. | 370/312 |
| 2012/0155291 A1* | 6/2012 | Koivisto et al. | 370/252 |
| 2013/0003668 A1* | 1/2013 | Xiao et al. | 370/329 |
| 2013/0039203 A1* | 2/2013 | Fong et al. | 370/252 |
| 2013/0044685 A1* | 2/2013 | Fong et al. | 370/328 |
| 2013/0148515 A1* | 6/2013 | Ribeiro et al. | 370/252 |
| 2013/0196675 A1* | 8/2013 | Xiao et al. | 455/452.1 |
| 2013/0242902 A1* | 9/2013 | Liu et al. | 370/329 |
| 2013/0322350 A1* | 12/2013 | Gaur et al. | 370/329 |

(Continued)

FOREIGN PATENT DOCUMENTS

WO    WO 2012096535 A2 *  7/2012

OTHER PUBLICATIONS

Machine Translation of WO 2012/096535.*

(Continued)

*Primary Examiner* — Paul H Masur
(74) *Attorney, Agent, or Firm* — Mattingly & Malur, PC

(57) ABSTRACT

A communications system employing CoMP transmission to suppress interference comprises: a CoMP user equipment; and a plurality of base stations, one of the base stations being an associated base station of the CoMP user equipment to transmit data to the CoMP user equipment, the plurality of base stations including multiple CoMP base stations for the CoMP user equipment. The CoMP base stations for the CoMP user equipment transmit CoMP downlink data, including subframes which comprise physical resource blocks having a plurality of resource elements (REs) and cell-specific reference signal (CRS) resource element (RE) locations. PDSCH bit-level muting or puncturing information is determined, based on radio resource management measurement and the subframes sent from the multiple CoMP base stations, to identify PDSCH REs that suffer strong CRS interference transmission from within the multiple CoMP base stations and are to be subjected to one of bit-level muting or bit-level puncturing.

18 Claims, 10 Drawing Sheets

(56) References Cited

U.S. PATENT DOCUMENTS

| | | |
|---|---|---|
| 2013/0336269 A1* | 12/2013 | Davydov et al. ............... 370/329 |
| 2014/0044054 A1* | 2/2014 | Kim et al. .................... 370/329 |
| 2014/0044104 A1* | 2/2014 | Kim et al. .................... 370/336 |
| 2014/0050201 A1* | 2/2014 | Onggosanusi et al. ....... 370/336 |

OTHER PUBLICATIONS

3GPP TS 36.212, "Multiplexing and channel coding (Release 10)", Dec. 2011, V10.4.0, pp. 1-79.*

3GPP TS 36.331, "Radio Resource Control (RRC); Protocol specification (Release 10)", Dec. 2011, V10.4.0 pp. 1-296.*

* cited by examiner

Table I PDSCH muting table
| RE Muting Pattern Index | Muted REs (denoted by the coordinates in a PRB grid) | bitmap | status |
|---|---|---|---|
| 0 | (5,1), (8,1), (12,1), (5,4), (8,4), (12,4)... | 0011 | Active |
| 1 | (5,2), (8,2), (12,2), (5,5), (8,5), (12,5)... | 0101 | Idle |
| 2 | (5,3), (8,3), (12,3), (5,6), (8,6), (12,6)... | 0100 | Idle |
| . | . | . | . |
| . | . | . | . |
| . | . | . | . |
FIG. 9
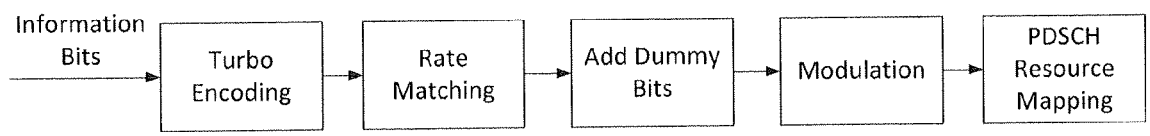
FIG. 10
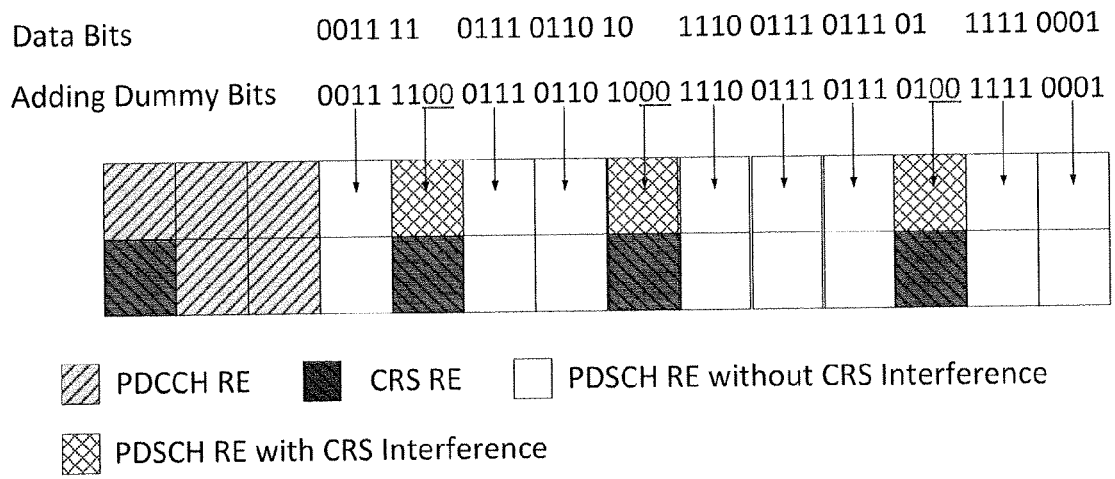
FIG. 11

METHOD AND APPARATUS FOR HANDLING DOWNLINK REFERENCE SIGNAL INTERFERENCE TO PDSCH IN LONG TERM EVOLUTION COORDINATED MULTIPOINT TRANSMISSION

BACKGROUND OF THE INVENTION

The present invention relates generally to communications systems and, more particularly, to method and apparatus for handling downlink reference signal interference to PDSCH (Physical Downlink Shared Channel) in LTE (Long Term Evolution) CoMP (coordinated multipoint) transmission.

In 4G cellular networks such as Long Term Evolution-Advanced (LTE-A) network, macro base stations (BSs) are expected to coexist with pico BSs in order to improve coverage and spectral efficiency per unit area. Additionally, two or more macro and/or pico BSs may perform coordinated multipoint (CoMP) transmission to a user equipment (UE) on the cell-edge to mitigate the impact of interference. In such a heterogeneous deployment where a UE can receive signals from several macro and pico BSs, the issue of interference arising from reference signals is a major issue even when multiple BSs perform CoMP transmission.

Different from existing networks, a LTE-A network can reduce the impact of neighboring cell interference on cell-edge UEs via CoMP transmission. This requires multiple neighboring BSs cooperation to eliminate co-channel interference to cell-edge UEs (except for possible CRS interference). Several BS cooperation methods are provisioned in LTE-A including Joint transmission (JT). In JT, two or more neighboring BSs (macro or pico) simultaneously transmit to a UE, resulting in improved SNR of received data streams which improve its throughput. However, the interference from CRS REs still remains.

BRIEF SUMMARY OF THE INVENTION

Exemplary embodiments of the invention provide a new interference suppression scheme for CoMP schemes to eliminate the interference arising due to reference signals from the CoMP BSs. The proposed method is expected to improve the cell average and cell edge throughput performances of the network.

During the downlink transmission, a UE is assigned a set of physical resource blocks (PRBs) by one or more cooperating BSs. These PRBs consist of several resource elements (REs) some of which may be corrupted by the interference arising from the reference signals from cooperating or interfering neighboring BSs. The present invention mitigates the detrimental impact of this co-channel interference by performing interference suppression steps for each affected RE received at the UE.

In one embodiment involving joint transmitter (Tx) receiver (Rx) processing, the UE informs the BS of the interference measurement report from neighboring BSs. The BS decides the bit-level muting pattern for PDSCH REs from different CoMP BSs which might overlap with each other's CRS REs. The BS informs the UE and the participating CoMP BSs of this bit-level muting pattern. The CoMP BSs perform PDSCH RE mapping using the bit-level muting pattern by embedding dummy bits for muted bits. Upon data reception, CoMP UE performs the CRS interference cancellation (optional step). Afterwards it discards the dummy bits and retrieves the transmitted data using the remaining bits.

In another embodiment involving receiver processing only, the UE performs the interference measurement and decides the bit-level puncturing pattern. Upon data reception, CoMP UE performs the CRS interference cancellation (optional step). Afterwards it punctures the bits from PDSCH REs affected by CRS interference as per the bit-level puncturing pattern and retrieves the transmitted data using the remaining bits.

In accordance with an aspect of the present invention, a communications system employing CoMP transmission to suppress interference comprises: a CoMP user equipment; and a plurality of base stations, one of the base stations being an associated base station of the CoMP user equipment to transmit data to the CoMP user equipment, the plurality of base stations including multiple CoMP base stations for the CoMP user equipment. The CoMP user equipment performs radio resource management (RRM) measurement on received reference signal (RS) strength for each base station of one or more other base stations in a surrounding area of the CoMP user equipment other than the associated base station. The CoMP base stations for the CoMP user equipment transmit CoMP downlink data, including subframes which comprise physical resource blocks having a plurality of resource elements (REs) and cell-specific reference signal (CRS) resource element (RE) locations. PDSCH bit-level muting or puncturing information is determined, based on the RRM measurement and the subframes which comprise physical resource blocks having a plurality of REs and CRS RE locations sent from the multiple CoMP base stations, to identify PDSCH REs that suffer strong CRS interference transmission from within the multiple CoMP base stations and are to be subjected to one of (i) bit-level muting whereby the PDSCH REs are allocated a number of bits less than the number of bits allocated to normal REs which are not to be muted and data with the bit-level muting is transferred to the CoMP user equipment, or (ii) bit-level puncturing whereby bit Log-Likelihood ratios (LLRs) corresponding to some bits in the PDSCH REs are punctured or discarded from the data received by the CoMP user equipment from the associated base station.

In some embodiments, the CRS RE locations in the physical resource blocks of the subframes sent from the multiple CoMP base stations are different so that the PDSCH REs include one or more sets of multiple PDSCH REs, the multiple PDSCH REs in each set carrying same data symbol at different RE locations after the bit-level muting or puncturing and before combination of the subframes of the multiple CoMP base stations, and becoming repeated PDSCH REs carrying same information bits after combination of the subframes of the multiple CoMP base stations. The bit LLRs for bits from the repeated PDSCH REs are added up together to obtain overall bit LLRs for the repeated PDSCH REs in each set.

In specific embodiments, for the bit-level muting, the associated base station identifies the PDSCH REs to be subjected to the bit-level muting and decides muted bit positions of the PDSCH REs to be muted so as to have a number of bits less than the number of bits allocated to normal REs, and the multiple CoMP base stations embed dummy bits in the muted bit positions of the PDSCH REs and simultaneously transmit the CoMP downlink data with the bit-level muting to the CoMP user equipment. The multiple CoMP base stations are each configured, before assigning dummy bits to the muted bit positions, to perform encoding and rate matching on a bit sequence containing the bits in the PDSCH REs. The multiple CoMP base stations are each configured, after assigning the dummy bits to the muted bit positions and before transferring the data with the bit-level muting of the PDSCH REs to the CoMP user equipment, to perform modulation and PDSCH resource mapping on the bit sequence so that each PDSCH RE accommodates one modulated symbol. The CoMP user equipment receives the CoMP downlink data from the multiple CoMP base stations, discards the dummy bits, and retrieves data using remaining bits.

In some embodiments, for the bit-level puncturing, the CoMP user equipment identifies the PDSCH REs to be subjected to the bit-level puncturing and decides punctured bits of the PDSCH REs to be removed so as to have a number of bits less than the number of bits allocated to normal REs. The CoMP user equipment receives the CoMP downlink data from the multiple CoMP base stations, removes the punctured bits, and retrieves data using remaining bits, and removing the punctured bits comprises discarding equal or unequal number of bit LLRs from the PDSCH REs.

Another aspect of the invention is directed to a base station in a communications system which includes a CoMP user equipment and a plurality of base stations, one of the base stations being an associated base station of the CoMP user equipment to transmit data to the CoMP user equipment, the plurality of base stations including multiple CoMP base stations for the CoMP user equipment. If the base station is the associated base station, the associated base station comprises: an interface to receive radio resource management (RRM) measurement from the CoMP user equipment on received reference signal (RS) strength for each base station of one or more other base stations in a surrounding area of the CoMP user equipment other than the associated base station; an X2 interface to receive, from the multiple CoMP base stations, transmission information of subframes which comprise physical resource blocks having a plurality of resource elements (REs) and cell-specific reference signal (CRS) resource elements (RE) locations; and a controller to manage PDSCH (Physical Downlink Shared Channel) bit-level muting information, which includes identifying PDSCH REs that suffer strong CRS interference transmission from within the multiple CoMP base stations and are to be subjected to bit-level muting whereby the PDSCH REs are allocated a number of bits less than the number of bits allocated to normal REs which are not to be muted, based on the RRM measurement and the subframes which comprise physical resource blocks having a plurality of REs and CRS RE locations sent from the multiple CoMP base stations, and deciding muted bit positions of the PDSCH REs to be muted. If the base station is one of the multiple CoMP base stations, the CoMP base station comprises: an X2 interface to receive the bit-level muting information from the associated base station; and a controller to embed dummy bits in the muted bit positions of the PDSCH REs and transmit, simultaneously with other CoMP base stations, CoMP downlink data with the bit-level muting to the CoMP user equipment.

In some embodiments, if the base station is the associated base station, the controller is configured to allocate to the PDSCH REs a number of bits less than the number of bits allocated to normal REs according to a K-bit bitmap for each PDSCH RE, and to decide the K-bit bitmap identifying one or more bit positions to be muted in each PDSCH RE, the number of bits allocated to an PDSCH RE being less than the number of bits allocated to a normal RE by a difference equal to the number of bit positions to be muted for the PDSCH RE.

In specific embodiments, if the base station is one of the CoMP base stations, the CoMP base station is configured, before assigning dummy bits to the muted bit positions, to perform encoding and rate matching on a bit sequence containing the bits in the PDSCH REs, and, after assigning the dummy bits to the muted bit positions and before transferring the data with the bit-level muting of the PDSCH REs to the CoMP user equipment, to perform modulation and PDSCH resource mapping on the bit sequence so that each PDSCH RE accommodates one modulated symbol.

Another aspect of this invention is directed to a CoMP user equipment in a communications system which includes the CoMP user equipment and a plurality of base stations, one of the base stations being an associated base station of the CoMP user equipment to transmit data to the CoMP user equipment, the plurality of base stations including multiple CoMP base stations for the CoMP user equipment. The CoMP user equipment comprises: a radio resource management (RRM) module to perform RRM measurement on received reference signal (RS) strength for each base station of one or more other base stations in a surrounding area of the user equipment other than the associated base station; and an interface to receive CoMP downlink data from the multiple CoMP base stations for the CoMP user equipment, including subframes which comprise physical resource blocks having a plurality of resource elements (REs) and cell-specific reference signal (CRS) resource element (RE) locations. PDSCH (Physical Downlink Shared Channel) bit-level muting or puncturing information is determined, based on the RRM measurement and the subframes which comprise physical resource blocks having a plurality of REs and CRS RE locations sent from the multiple CoMP base stations, to identify PDSCH REs that suffer strong CRS interference transmission from within the multiple CoMP base stations and are to be subjected to one of (i) bit-level muting whereby the PDSCH REs are allocated a number of bits less than the number of bits allocated to normal REs which are not to be muted and data with the bit-level muting is transferred to the CoMP user equipment, or (ii) bit-level puncturing whereby bit Log-Likelihood ratios (LLRs) corresponding to some bits in the PDSCH REs are punctured or discarded from the data received by the CoMP user equipment from the associated base station. If the bit-level muting is used, the interface of the CoMP user equipment receives, from the associated base station, the bit-level muting information which includes the PDSCH REs to be subjected to bit-level muting and allocation to the PDSCH REs a number of bits less than the number of bits allocated to normal REs which are not to be muted. If the bit-level puncturing is used, the CoMP user equipment further comprises a bit-level PDSCH puncturing module to determine the bit-level puncturing information which includes the PDSCH REs to be subjected to bit-level puncturing.

In some embodiments, if the bit-level muting is used, the bit-level muting information includes a K-bit bitmap for each PDSCH RE used to allocate to the PDSCH REs a number of bits less than the number of bits allocated to normal REs, and the K-bit bitmap identifies one or more bit positions to be muted in each PDSCH RE, the number of bits allocated to an PDSCH RE being less than the number of bits allocated to a normal RE by a difference equal to the number of bit positions to be muted for the PDSCH RE. The dummy bits are added to the muted bit positions of each PDSCH RE in the data with the bit-level muting of the PDSCH REs received by the CoMP user equipment via the interface from the multiple CoMP base stations, and the CoMP user equipment comprises a baseband processor to remove the dummy bits based on the bit-level muting information received from the associated base station.

In specific embodiments, if the bit-level muting is used, the data received includes PDSCH REs, each PDSCH RE accommodating one modulated symbol; the baseband processor is configured, before removing the dummy bits, to demap the received PDSCH REs to a modulated symbol stream and to demodulate the modulated symbol stream to a bit sequence;

and the baseband processor is configured, after removing the dummy bits from the bit sequence, to perform rate dematching and decoding on the bit sequence.

In some embodiments, if the bit-level puncturing is used, the bit-level PDSCH puncturing module manages bit-level PDSCH puncturing information which includes a K-bit bitmap for each PDSCH RE used to allocate to the PDSCH REs a number of bits less than the number of bits allocated to normal REs; and the K-bit bitmap identifies one or more bit positions to be punctured in each PDSCH RE, the number of bits allocated to an PDSCH RE being less than the number of bits allocated to a normal RE by a difference equal to the number of bit positions to be punctured for the PDSCH RE. The CoMP user equipment further comprises a baseband processor to remove punctured bits at the punctured bit positions of each PDSCH RE in the data received.

In specific embodiments, if the PDSCH REs all have a same number of bits to be punctured, the baseband processor is configured to remove the same number of punctured bits from the PDSCH REs, which includes discarding equal number of bit LLRs from the PDSCH REs. If the PDSCH REs have different numbers of bits to be punctured, the baseband processor is configured to remove different numbers of punctured bits from the PDSCH REs, which includes discarding unequal number of bit LLRs from the PDSCH REs. Each PDSCH RE accommodates one modulated symbol. The baseband processor is configured, before removing the punctured bits, to demap the received PDSCH REs to a modulated symbol stream and to demodulate the modulated symbol stream to a bit sequence. The baseband processor is configured, after removing the punctured bits from the bit sequence, to perform rate dematching and decoding on the bit sequence. The CoMP user equipment further comprises a CRS interference cancellation module to perform CRS interference cancellation on the data received before the baseband processor demaps the received PDSCH REs to a modulated symbol stream.

These and other features and advantages of the present invention will become apparent to those of ordinary skill in the art in view of the following detailed description of the specific embodiments.

BRIEF DESCRIPTION OF THE DRAWINGS

FIG. 9 shows an example of a PDSCH muting table.

FIG. 10 is an example of a flow diagram illustrating the baseband TX processing in the proposed scheme under the first approach according to an embodiment of the present invention.

FIG. 11 shows an example of adding dummy bits in the proposed scheme at CoMP BS1 under the first approach.

DETAILED DESCRIPTION OF THE INVENTION

Figure 1:
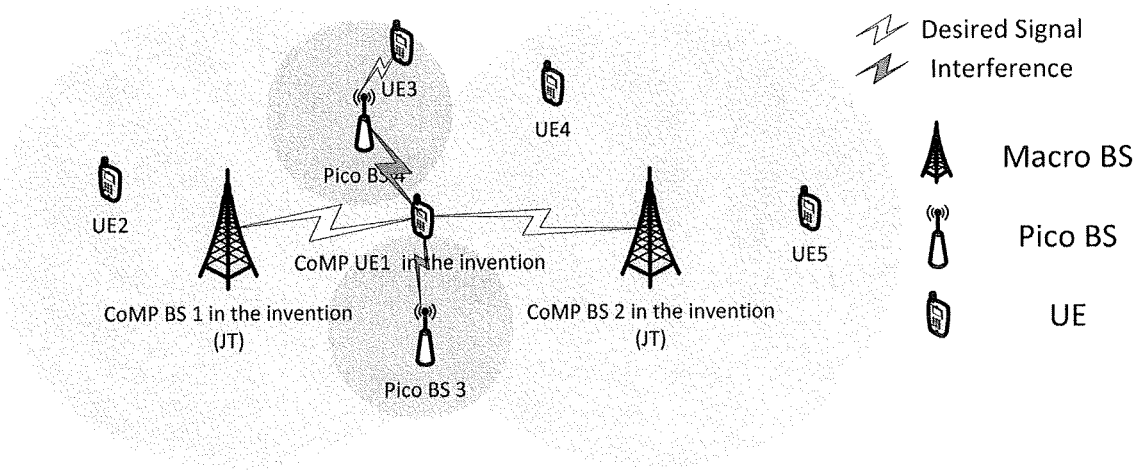
FIG. 1 shows an example of a heterogeneous network including joint transmission (JT) coordinated multipoint (CoMP) transmission operation.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium including non-transient medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for handling downlink reference signal interference to PDSCH in LTE CoMP (coordinated multipoint) transmission. This invention proposes solutions to handle interference from cell-specific reference signals (CRSs) arising during a CoMP transmission such as Joint Transmission (JT). In a heterogeneous network, one or more macro/pico BSs can cooperatively transmit to a UE on the cell-edge. Despite the cooperative nature of the transmission, the interference from CRS REs is present and can degrade the performance of CoMP technique. Two approaches are described for handling the CRS interference for CoMP UEs. Examples involve the downlink of a cellular network.

FIG. 1 shows an example of a heterogeneous network including joint transmission (JT) coordinated multipoint (CoMP) transmission operation. In the heterogeneous cellular network with coordinated downlink transmissions, the macro and pico BSs coexist to serve UEs in an area. UE1 is associated with Macro BS1 but receives CoMP downlink data from both Macro BS1 and Macro BS2. Even though these transmissions are coordinated, the UE may still face CRS interference from CoMP BS1 and CoMP BS2. For example, a PDSCH RE transmitted by CoMP BS1 may be interfered by CRS RE transmitted by CoMP BS2 and vice versa.

Figure 2:
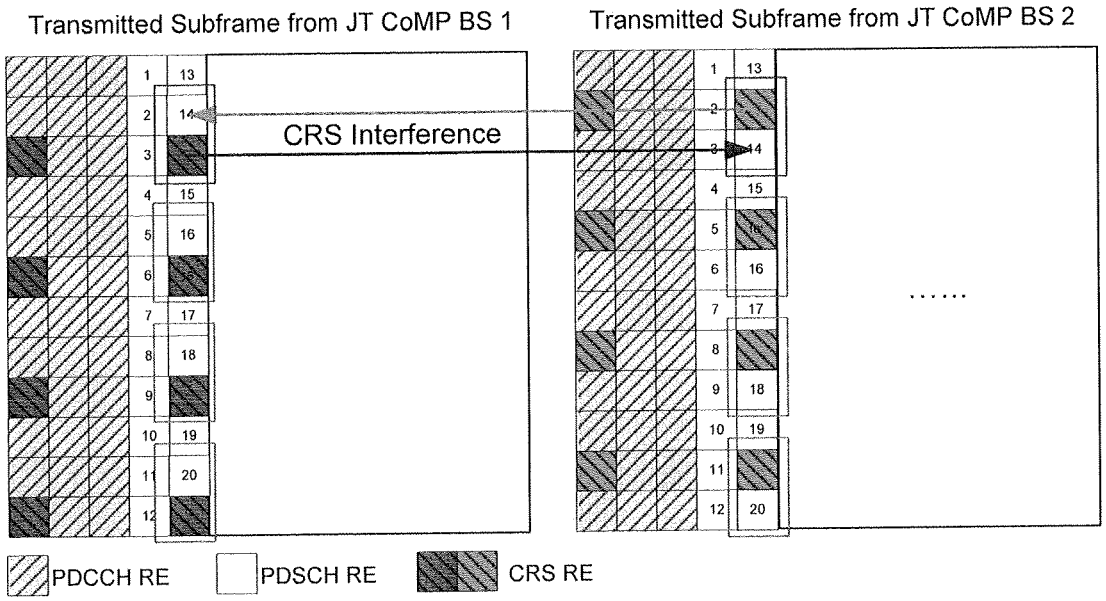
FIG. 2 shows an example of CRS interference during JT CoMP reception.

FIG. 2 shows an example of CRS interference during JT CoMP reception, more specifically, from BS1 and BS2 of FIG. 1. It can be seen that some PDSCH REs such as RE number 14 of BS1 gets CRS interference from BS2 and vice versa. The present invention can be implemented in CoMP BS1, CoMP BS2, and UE1 to reduce the CRS interference during CoMP transmission. It may be noted that CoMP BS may be a macro or pico BS.

Figure 3:
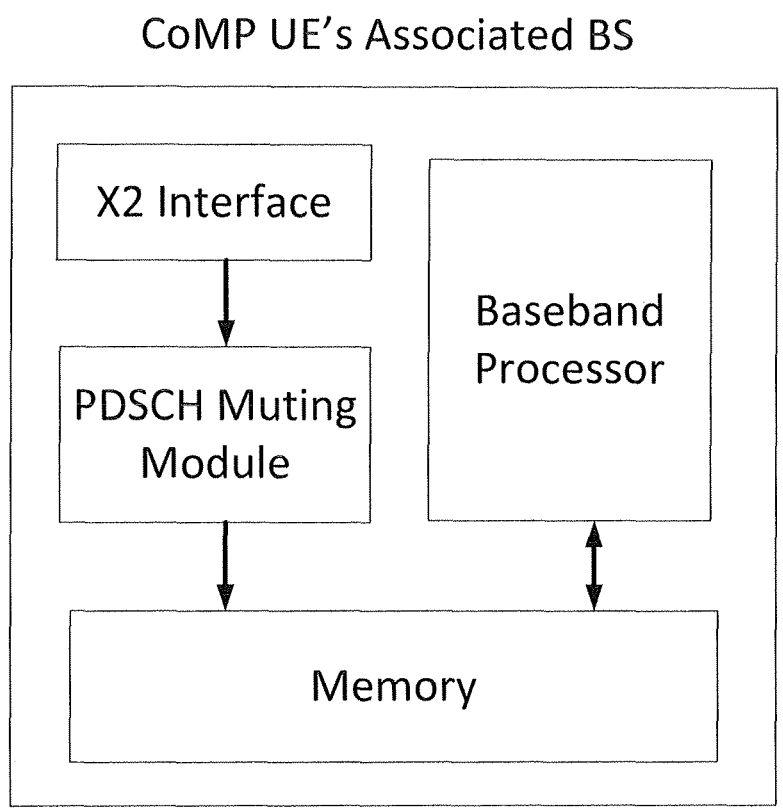
FIG. 3 is a block diagram illustrating an example of a CoMP UE's associated BS.

FIG. 3 is a block diagram illustrating an example of a CoMP UE's associated BS (macro BS 1 as shown in FIG. 1). The associated BS includes the X2 interface, through which the CoMP BSs exchange information (e.g., data and/or channel information, RRM measurement report from the served UE) among each other, and the following three components: (i) a PDSCH muting module, which determines the bit-level PDSCH muting pattern (as will be shown later in FIG. 6) and updates the PDSCH muting table (as will be defined in the table shown in FIG. 9) in the memory; (ii) a baseband processor, which performs the TX (transmit) processing as will be shown later in FIG. 11; and (iii) a memory, where the PDSCH muting table is stored.

Figure 4:
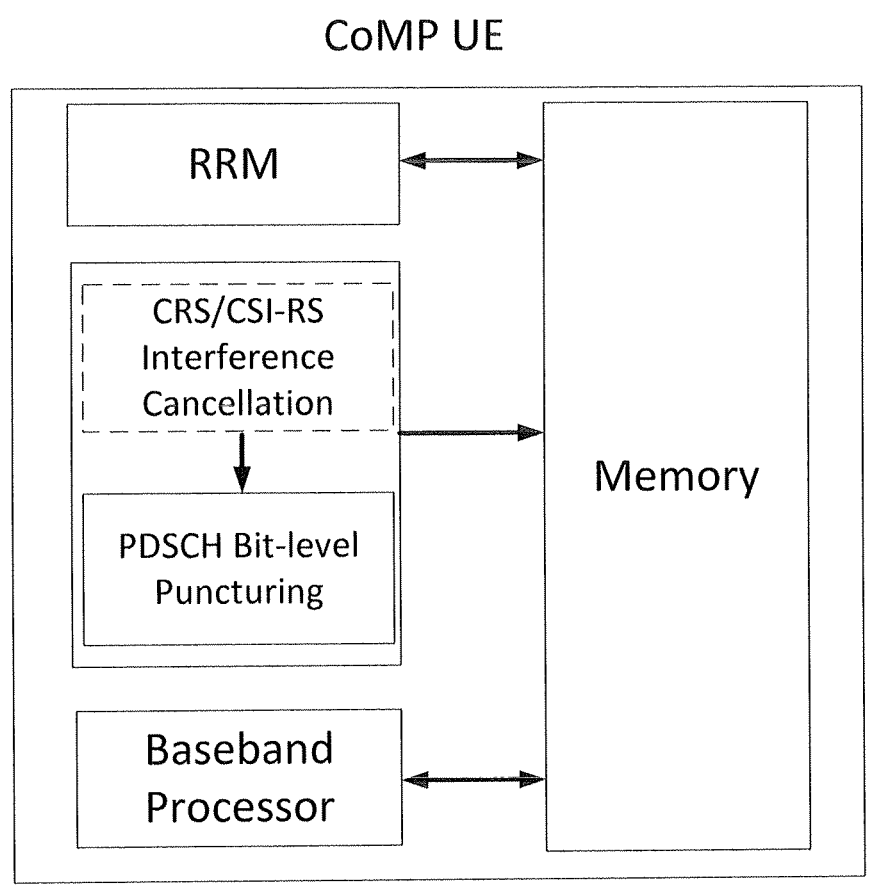
FIG. 4 is a block diagram illustrating an example of a CoMP UE.

FIG. 4 is a block diagram illustrating an example of a CoMP UE (UE1 as shown in FIG. 1). In FIG. 4, the CoMP UE includes a controller having the following four components and one optional component: (i) a RRM module, where the RRM measurement is performed and reported to the associated BS and shared with all CoMP BSs; (ii) an optional CRS/CSI-RS interference cancellation module, which can cancel out the dominant interference from reference signals; (iii) a PDSCH puncturing module, which receives the bit-level PDSCH muting pattern from its associated BS and updates the PDSCH muting table in the memory; (iv) a baseband processor, which performs the RX (receive) processing as will be shown in FIG. 7; and (v) a memory, where the PDSCH muting table is stored.

First Approach

Figure 5:
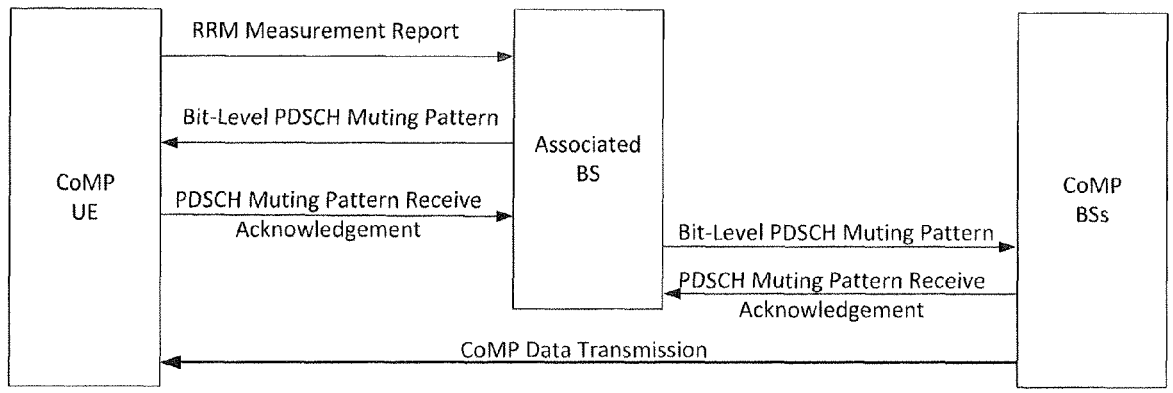
FIG. 5 shows an example of signaling exchange between a CoMP UE, associated BS, and the CoMP BSs.

FIG. 5 shows an example of signaling exchange between a CoMP UE, associated BS (i.e., BS1), and the CoMP BSs. Note that the associated BS may or may not be a CoMP BS. At the beginning of the data transmission, the UE performs the RRM measurement as defined in e.g., in 3GPP TS36.331 v.10.4.0 (Ref. 1), and sends the measurement report to its associated BS, which contains the received RS strength for each BS in its surrounding area. Based on the RRM measurement report and the information of the CRS RE location from the neighboring BSs, the associated BS identifies the bit-level PDSCH muting pattern which consists of (i) the PDSCH REs which will suffer from strong CRS interference from CoMP BSs, and (ii) the number of bits in identified PDSCH REs which are unlikely to be corrupted by the CRS interference. Afterwards, the associated BS sends the bit-level PDSCH muting pattern to the CoMP UE for the receiver (RX) processing. After the associated BS receives the acknowledgement from the UE, it informs the CoMP BSs of the bit-level PDSCH muting pattern. The CoMP BSs respond with acknowledgement to the associated BS and start data transmission by performing the proposed transmitter (TX) processing. At the UE end, the proposed receiver processing is performed accordingly for data reception.

Figure 6:
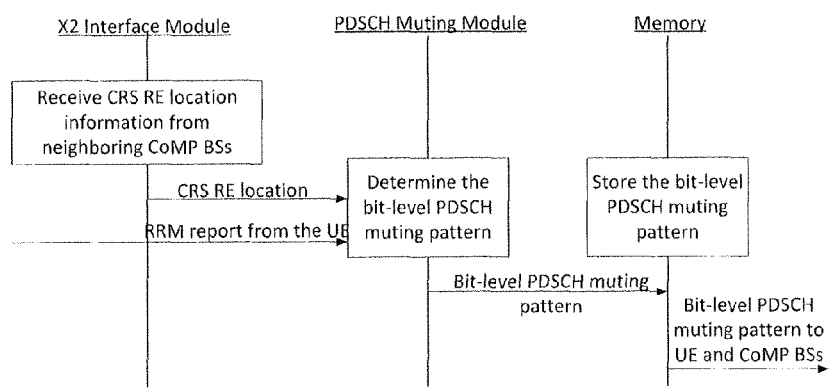
FIG. 6 is an example of a flow diagram illustrating the operation in a CoMP UE's associated BS.

FIG. 6 is an example of a flow diagram illustrating the operation in a CoMP UE's associated BS (i.e., BS1). The X2 interface module of the BS receives the information of the CRS RE locations from its neighboring CoMP BSs and inputs such information to the PDSCH muting module (e.g., how much interference there is, which BS signals are received and how strong these signals are). Based on the input of the X2 interface module and the RRM report from the UE, the PDSCH muting module determines the bit-level PDSCH muting pattern and sends the information to the CoMP UE and the CoMP BSs.

Figure 7:
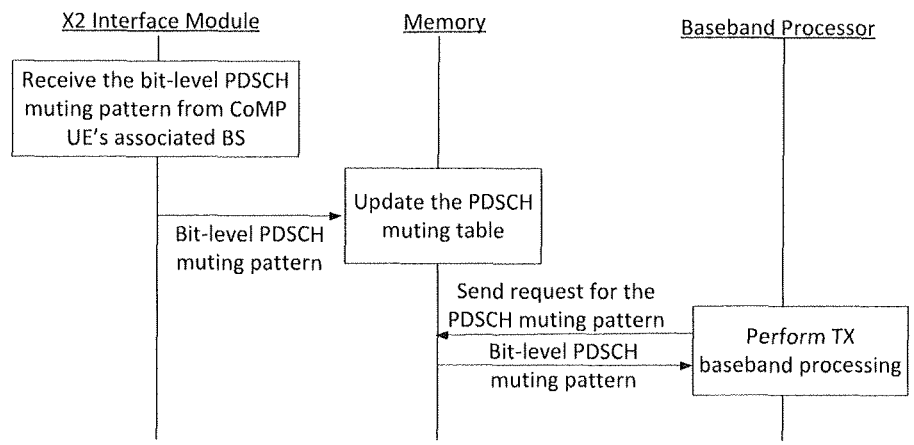
FIG. 7 is an example of a flow diagram illustrating the operation in a CoMP BS.

FIG. 7 is an example of a flow diagram illustrating the operation in a CoMP BS (i.e., BS1, BS2 in the example). The X2 interface module of the CoMP BS receives the bit-level PDSCH muting pattern from the CoMP UE's associated BS (which is BS1 in the example). Based on the input of the X2 interface module, the CoMP BS updates the PDSCH muting table in the memory. The PDSCH muting table in the memory will be used by baseband processor for transmitter processing.

Transmitter Processing Under the First Approach

Figure 8:
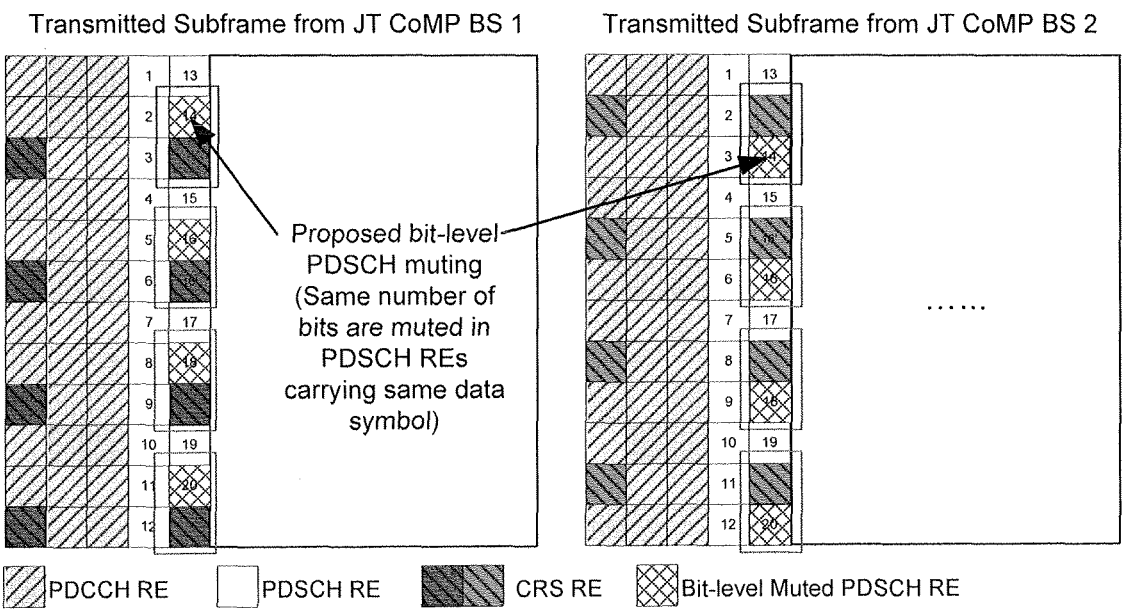
FIG. 8 is an example of PDSCH bit level muting to counter CRS interference during JT CoMP reception.

FIG. 8 is an example of PDSCH bit level muting to counter CRS interference during JT CoMP reception. This is used to illustrate how to determine the bit-level PDSCH muting pattern and update the PDSCH muting table for the CoMP BSs. Consider the example of JT CoMP transmission in the heterogeneous network as shown in FIG. 1, wherein CoMP UE1 receives subframes from CoMP BS1 and CoMP BS2 simultaneously. FIG. 2 shows the transmitted subframes including physical resource blocks (PRBs) from the two BSs along with respective CRS REs. Note that all PRBs from a given CoMP BS will have the same locations of the CRS REs. After receiving the location of the CRS REs from the CoMP BSs, and the RRM report from the CoMP UE (which indicates the signal strength of all CoMP BSs), the CoMP UE's associated BS identifies the REs that suffer strong CRS interference transmission from within the CoMP BSs, i.e., the REs with cross-hatching as shown in FIG. 8. Afterwards, the PDSCH muting module updates the PDSCH muting table in the memory.

FIG. 9 shows an example of a PDSCH muting table. The PDSCH muting table has columns of RE Muting Pattern Index, Muted REs, bitmap, and status. The "Muted REs" column is predefined and fixed. The PDSCH muting module chooses the RE muting patterns whose bit-level "muted REs" column covers the largest number of the identified REs with strong CRS interference and sets its status to be "Active." Note that other RE muting patterns will be automatically set to be "idle" after one RE muting pattern is picked to be "Active." Assume that each PDSCH RE carries K information bits. The associated BS then decides the bit-level muting position in each RE with strong CRS interference, which can be represented by a K-bit bitmap with "1" indicating muting, i.e., the particular bit being set as a dummy bit. For example, 0011 means that for K=4, the last 2 bits are muted (set as dummy bits) in a muted RE. Meanwhile, the associated BS informs the CoMP UE as well as the CoMP BSs of the bit-level PDSCH muting pattern, i.e., the PDSCH muting pattern index and the corresponding bitmap.

The PDSCH muting module is actually PDSCH bit-level muting module that performs bit-level muting of bits instead of RE-level muting of the entire RE where no data transmission occurs in that particular RE. Another way to characterize its function is that it allows a "muted RE" to carry a number of bits less than the number of bits allocated to normal REs that are not affected or substantially not affected by CRS interference. The PDSCH bit-level muting module may also be referred to as RE bit allocation module.

FIG. 10 is an example of a flow diagram illustrating the baseband TX processing in the proposed scheme under the first approach according to an embodiment of the present invention. FIG. 10 shows the transmitter (TX) baseband processing performed at each CoMP BS for transmission to the CoMP UE. The information bits (e.g., L bits) of a transport block first pass through the turbo encoder (e.g., 3L+12 bits) that is specified in 3GPP TS36.212 v.10 (Ref. 2). The baseband processor then performs rate matching (E bits being less than 3L+12 bits) and adds dummy bits to the encoded bits according to active PDSCH muting pattern in the PDSCH muting table in the memory. Finally, the bit sequence is modulated and mapped to the PDSCH REs. The details of each operation are explained as follows.

Turbo Encoding: This operation is specified in Ref. 2.

Rate Matching: The circular buffer rate matching (CBRM) defined, e.g., in Ref. 2, is used and configured such that the number of bits after rate matching is K(N−M)−MD, where N is the number of PDSCH REs assigned to the UE, M is the number of bit-level Muted REs, K is the modulation order (i.e., the number of bits carried in each PDSCH RE), and D is the number of "1"s in the bitmap of the active PDSCH muting pattern. The number of bits allocated to normal REs is the same as the underlying modulation order.

Adding Dummy Bits: D dummy bits are added to each PDSCH RE with CRS interference.

Modulation: The modulation is specified, e.g., in Ref. 2 where K takes value from 2(QPSK), 4(16QAM), and 6(64QAM).

PDSCH Resource Mapping: The modulated symbols are mapped to PDSCH REs such that each PDSCH RE accommodates one modulated symbol.

FIG. 11 shows an example of adding dummy bits in the proposed scheme at CoMP BS1 under the first approach. This relates to TX processing. Assume that one resource block is assigned to a UE, where twelve REs in the PDSCH region suffer strong CRS interference as shown in FIG. 11. Additionally, assume 16QAM is used for modulation and 2 dummy bits are added for each RE with CRS interference. In this case, we have N=120, M=12, K=4, and D=2. The total number of bits after rate matching is K(N−M)−MD=408. We assume that the bit sequence after rate matching is 0011110111011010111001110110111110001 . . . as shown in FIG. 11. After adding dummy bits, the sequence becomes 0011 1100 0111 0110 1000 1110 0111 0111 0100 1111 0001 . . . based on the assumption that the modulated symbols are mapped to PDSCH REs first along the horizontal line and then along the vertical line.

Receiver Processing Under the First Approach

Figure 12:
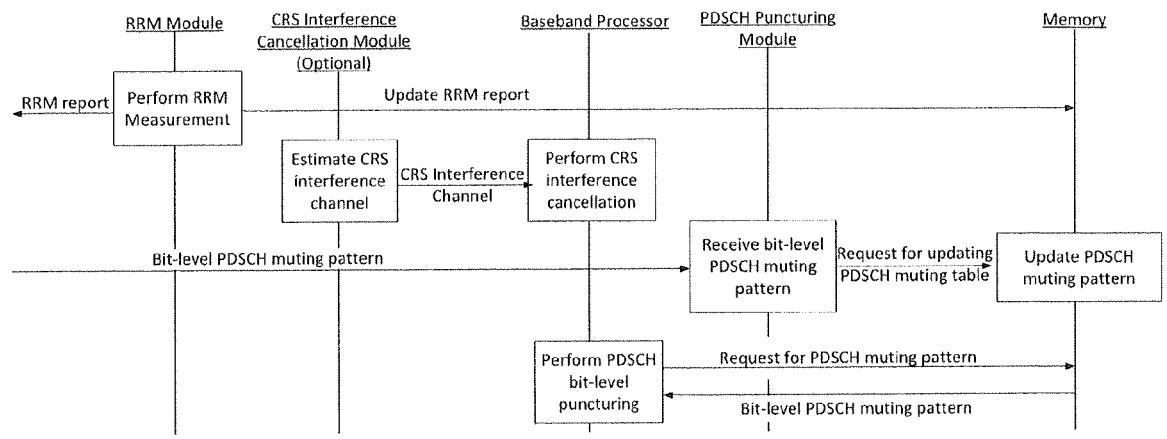
FIG. 12 is an example of a flow diagram illustrating the operation in a CoMP UE of FIG. 4 under the first approach.

FIG. 12 is an example of a flow diagram illustrating the operation in a CoMP UE of FIG. 4 under the first approach. The UE uses the RRM module to perform RRM measurement and reports to its associated BS. The UE may support CRS interference cancellation module and, if so, it performs CRS interference cancellation on PDSCH REs which coincide with CRS REs transmitted by CoMP BSs. Next, after receiving the bit-level PDSCH muting pattern, the PDSCH puncturing module updates the PDSCH muting table in the memory by setting the corresponding PDSCH muting pattern to be active and updating the bitmap. Note that the PDSCH muting table for the UE has the same format as that for its associated BS and the columns of "PDSCH muting pattern index" and bit-level "Muted REs" are also the same. The PDSCH muting table in the memory will be used by the baseband processor for RX processing.

Figure 13:
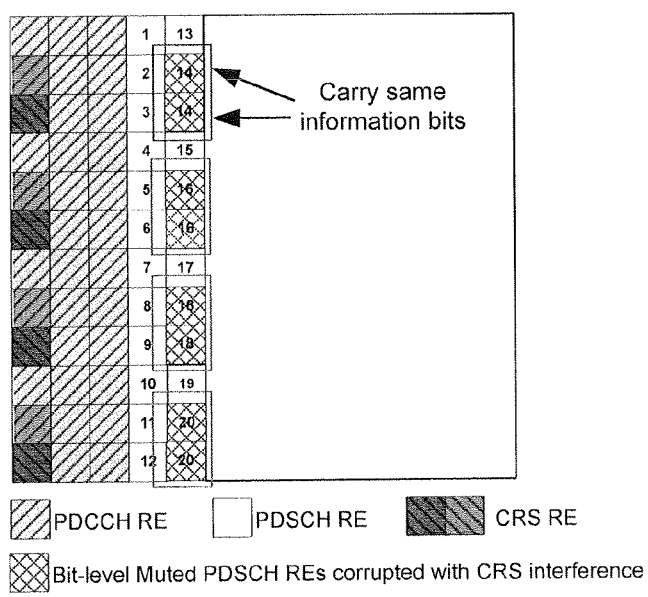
FIG. 13 is an example of a JT CoMP received by a JT CoMP UE under the first approach.

FIG. 13 is an example of a JT CoMP received by a JT CoMP UE under the first approach. The JT CoMP subframes transmitted by the CoMP BSs (shown in FIG. 8) are transmitted simultaneously and, as a result, the CoMP UE receives an over-the-air combined subframe shown in FIG. 13. Some of the PDSCH REs which are corrupted by the CRS interference carry the same information data as shown in FIG. 13. In a given example, CRS interference corrupted PDSCH RE 14 is repeated twice; similarly PDSCH REs 16, 18, 20 are repeated twice. Therefore, the bit log-likelihood ratios (LLRs) for the bits from repeated PDSCH REs must be added up together to get the overall bit LLRs for these PDSCH REs.

Figure 14:
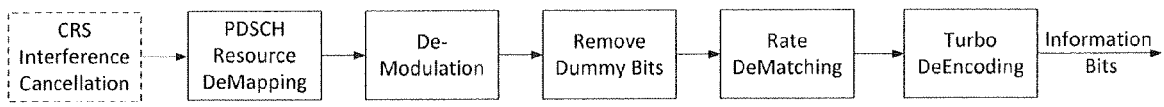
FIG. 14 shows an example of a flow diagram illustrating the RX processing in the proposed scheme under the first approach.

FIG. 14 shows an example of a flow diagram illustrating the RX processing in the proposed scheme under the first approach. More specifically, the RX processing is RX baseband processing for a CoMP UE, which is the reverse operation of the TX processing. After performing optional CRS interference cancellation, the received PDSCH REs are demapped to a modulated symbol stream, which is then demodulated to a bit sequence. The dummy bits are removed from the bit sequence according to the active PDSCH muting pattern in the PDSCH muting table stored in the memory. Finally, rate dematching and turbo decoding are performed. Note that the output of the demodulation is the logarithm of the likelihood ratio or Log-Likelihood ratio (LLR) of each bit. By removing dummy bits, we mean discarding the LLRs of the dummy bits. As mentioned earlier, the bit LLRs for the repeated PDSCH REs are added up together to get overall bit LLRs for these PDSCH REs.

Figure 15:
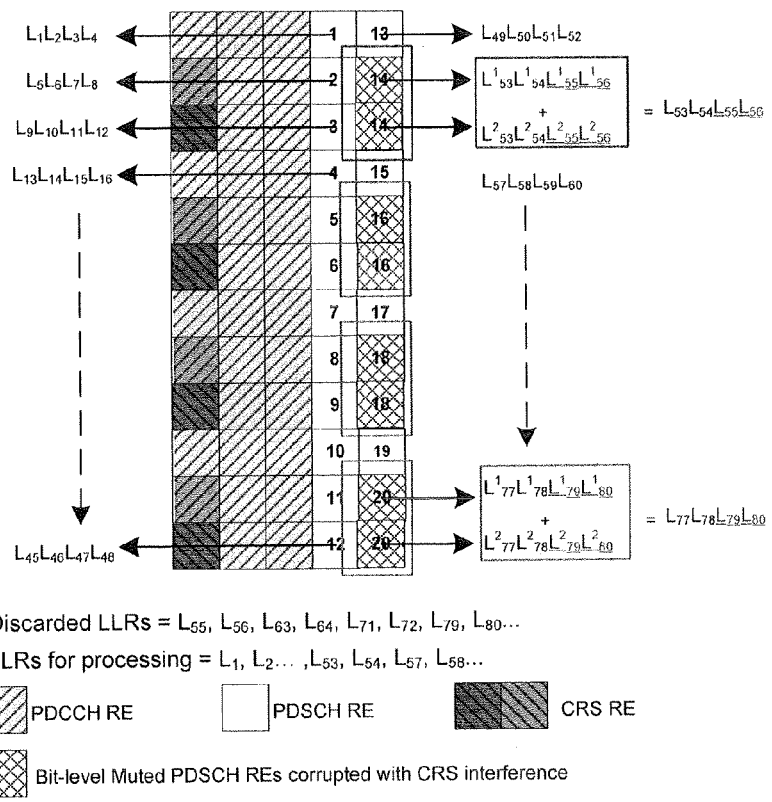
FIG. 15 shows an example of the RX processing in the proposed scheme under the first approach.

FIG. 15 shows an example of the RX processing in the proposed scheme under the first approach. Assume that the TX processing as shown in FIG. 10 is performed at the CoMP BSs. Let Lk denote the LLR of the k-th bit. The LLRs corresponding to discarded dummy bits are L55, L56, L63, L64, L71, L79, and so on. It may be noted that the first approach always has the same number of dummy bits in PDSCH REs with CRS interference. The LLR sequence after dropping dummy bits is L1, L2, ..., L53, L54, L57, L58, and so on.

Second Approach

Figure 16:
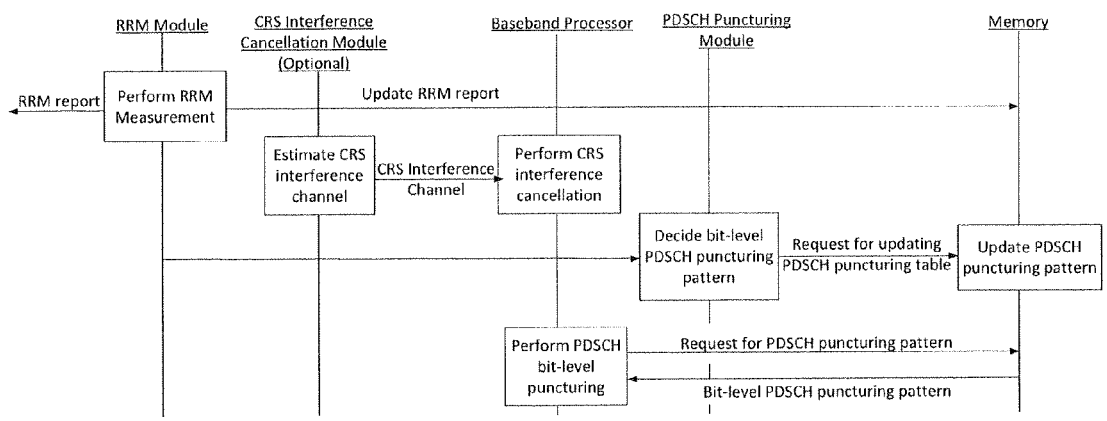
FIG. 16 shows an example of a flow diagram illustrating the operation in a CoMP UE of FIG. 4 under the second approach according to another embodiment of the invention.

The second approach needs to be implemented at the UE end only. This approach assumes no PDSCH muting at CoMP BSs. FIG. 16 shows an example of a flow diagram illustrating the operation in a CoMP UE of FIG. 4 under the second approach according to another embodiment of the invention. The UE uses the RRM module to perform RRM measurement and uses the interference information to decide a bit-level PDSCH puncturing pattern for PDSCH REs suffering from CRS interference arising from other BSs. After performing optional CRS interference cancellation, the PDSCH puncturing module updates the PDSCH puncturing pattern in the memory. The PDSCH puncturing pattern in the memory will be used by the baseband processor for RX processing.

Figure 17:
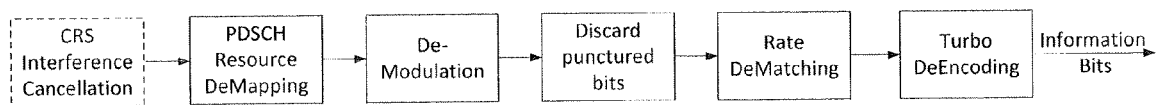
FIG. 17 is an example of a flow diagram illustrating the RX processing in the proposed scheme under the second approach.

FIG. 17 is an example of a flow diagram illustrating the RX processing in the proposed scheme under the second approach. More specifically, the RX processing is RX baseband processing for a CoMP UE. After performing optional CRS cancellation, the received PDSCH REs are demapped to a modulated symbol stream, which is then demodulated to a bit sequence. The punctured bits are removed from the bit sequence according to the active PDSCH puncturing pattern in the PDSCH puncturing pattern stored in the memory. Finally, rate dematching and turbo decoding are performed. Note that the output of the demodulation is the logarithm of the likelihood ratio (LLR) of each bit. By removing punctured bits, we mean discarding the LLRs of the punctured bits.

Figure 18:
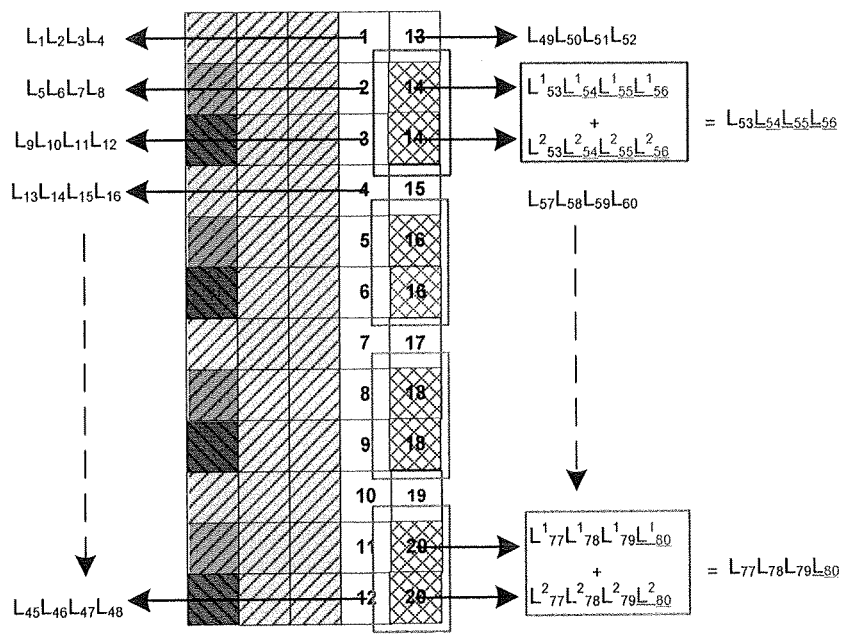
FIG. 18 shows an example of the RX processing in the proposed scheme under the second approach.

FIG. 18 shows an example of the RX processing in the proposed scheme under the second approach. Let Lk denote the LLR of the k-th bit. Different from the first approach, which discards "equal" number of bit LLRs in PDSCH REs with CRS interference, the second approach uses a PDSCH puncturing pattern which can discard equal or unequal number of bit LLRs from various PDSCH REs with CRS interference. In the example shown in FIG. 18, 3 bit LLRs are discarded from PDSCH RE number 14, and 1 bit LLR is discarded from PDSCH RE number 20. The LLRs for punctured bits are L54, L55, L56, L80, and so on. The LLR sequence fed to the Turbo decoder is: L1, L2, ..., L53, L57, L58, and so on.

The above describes two approaches to reduce the CRS interference arising from CoMP BSs during a CoMP transmission. These approaches can be used in LTE-A CoMP transmission to improve the overall system performance.

The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for handling downlink reference signal interference to PDSCH in LTE CoMP transmission. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A communications system employing coordinated multipoint (CoMP) transmission to suppress interference, the system comprising:
   a CoMP user equipment; and
   a plurality of base stations, one of the base stations being an associated base station of the CoMP user equipment to transmit data to the CoMP user equipment, the plurality of base stations including multiple CoMP base stations for the CoMP user equipment;
   wherein the CoMP user equipment performs radio resource management (RRM) measurement on received reference signal (RS) strength for each base station of one or more other base stations in a surrounding area of the CoMP user equipment other than the associated base station;
   wherein the CoMP base stations for the CoMP user equipment transmit CoMP downlink data, including subframes which comprise physical resource blocks having a plurality of resource elements (REs) and cell-specific reference signal (CRS) resource element (RE) locations;
   wherein PDSCH (Physical Downlink Shared Channel) bit-level muting or puncturing information is determined, based on the RRM measurement and the subframes which comprise physical resource blocks having a plurality of REs and CRS RE locations sent from the multiple CoMP base stations, to identify PDSCH REs that suffer strong CRS interference transmission from within the multiple CoMP base stations and are to be subjected to one of (i) bit-level muting whereby the PDSCH REs are allocated a number of bits less than the number of bits allocated to normal REs which are not to be muted and data with the bit-level muting is transferred to the CoMP user equipment, or (ii) bit-level puncturing whereby bit Log-Likelihood ratios (LLRs) corresponding to some bits in the PDSCH REs are punctured or discarded from the data received by the CoMP user equipment from the associated base station; and
   wherein for the bit-level muting, the associated base station identifies the PDSCH REs to be subjected to the bit-level muting and decides muted bit positions of the PDSCH REs to be muted so as to have a number of bits less than the number of bits allocated to normal REs, and the multiple CoMP base stations embed dummy bits in the muted bit positions of the PDSCH REs and simultaneously transmit the CoMP downlink data with the bit-level muting to the CoMP user equipment.

2. The system according to claim 1,
   wherein the CRS RE locations in the physical resource blocks of the subframes sent from the multiple CoMP base stations are different so that the PDSCH REs include one or more sets of multiple PDSCH REs, the multiple PDSCH REs in each set carrying same data symbol at different RE locations after the bit-level muting or puncturing and before combination of the subframes of the multiple CoMP base stations, and becoming repeated PDSCH REs carrying same information bits after combination of the subframes of the multiple CoMP base stations; and
   wherein the bit LLRs for bits from the repeated PDSCH REs are added up together to obtain overall bit LLRs for the repeated PDSCH REs in each set.

3. The system according to claim 1, wherein for the bit-level muting,
   the multiple CoMP base stations are each configured, before assigning dummy bits to the muted bit positions, to perform encoding and rate matching on a bit sequence containing the bits in the PDSCH REs; and
   the multiple CoMP base stations are each configured, after assigning the dummy bits to the muted bit positions and before transferring the data with the bit-level muting of the PDSCH REs to the CoMP user equipment, to perform modulation and PDSCH resource mapping on the bit sequence so that each PDSCH RE accommodates one modulated symbol.

4. The system according to claim 1, wherein for the bit-level muting,
   the CoMP user equipment receives the CoMP downlink data from the multiple CoMP base stations, discards the dummy bits, and retrieves data using remaining bits.

5. A communications system employing coordinated multipoint (CoMP) transmission to suppress interference, the system comprising:
   a CoMP user equipment; and
   a plurality of base stations, one of the base stations being an associated base station of the CoMP user equipment to transmit data to the CoMP user equipment, the plurality of base stations including multiple CoMP base stations for the CoMP user equipment;
   wherein the CoMP user equipment performs radio resource management (RRM) measurement on received reference signal (RS) strength for each base station of one or more other base stations in a surrounding area of the CoMP user equipment other than the associated base station;
   wherein the CoMP base stations for the CoMP user equipment transmit CoMP downlink data, including subframes which comprise physical resource blocks having a plurality of resource elements (REs) and cell-specific reference signal (CRS) resource element (RE) locations;
   wherein PDSCH (Physical Downlink Shared Channel) bit-level muting or puncturing information is determined, based on the RRM measurement and the subframes which comprise physical resource blocks having a plurality of REs and CRS RE locations sent from the multiple CoMP base stations, to identify PDSCH REs that suffer strong CRS interference transmission from within the multiple CoMP base stations and are to be subjected to one of (i) bit-level muting whereby the PDSCH REs are allocated a number of bits less than the number of bits allocated to normal REs which are not to be muted and data with the bit-level muting is transferred to the CoMP user equipment, or (ii) bit-level puncturing whereby bit Log-Likelihood ratios (LLRs) corresponding to some bits in the PDSCH REs are punctured or discarded from the data received by the CoMP user equipment from the associated base station; and
   wherein for the bit-level puncturing, the CoMP user equipment identifies the PDSCH REs to be subjected to the bit-level puncturing and decides punctured bits of the PDSCH REs to be removed so as to have a number of bits less than the number of bits allocated to normal REs.

6. The system according to claim 5, wherein for the bit-level puncturing,
   the CoMP user equipment receives the CoMP downlink data from the multiple CoMP base stations, removes the punctured bits, and retrieves data using remaining bits; and
   removing the punctured bits comprises discarding equal or unequal number of bit LLRs from the PDSCH REs.

7. The system according to claim 5,
   wherein the CRS RE locations in the physical resource blocks of the subframes sent from the multiple CoMP base stations are different so that the PDSCH REs include one or more sets of multiple PDSCH REs, the multiple PDSCH REs in each set carrying same data symbol at different RE locations after the bit-level muting or puncturing and before combination of the subframes of the multiple CoMP base stations, and becoming repeated PDSCH REs carrying same information bits after combination of the subframes of the multiple CoMP base stations; and wherein the bit LLRs for bits from the repeated PDSCH REs are added up together to obtain overall bit LLRs for the repeated PDSCH REs in each set.

8. A base station in a communications system which includes a coordinated multipoint (CoMP) user equipment and a plurality of base stations, one of the base stations being an associated base station of the CoMP user equipment to transmit data to the CoMP user equipment, the plurality of base stations including multiple CoMP base stations for the CoMP user equipment, wherein if the base station is the associated base station, the associated base station comprises:

an interface to receive radio resource management (RRM) measurement from the CoMP user equipment on received reference signal (RS) strength for each base station of one or more other base stations in a surrounding area of the CoMP user equipment other than the associated base station;

an X2 interface to receive, from the multiple CoMP base stations, transmission information of subframes which comprise physical resource blocks having a plurality of resource elements (REs) and cell-specific reference signal (CRS) resource elements (RE) locations; and a controller to manage PDSCH (Physical Downlink Shared Channel) bit-level muting information, which includes identifying PDSCH REs that suffer strong CRS interference transmission from within the multiple CoMP base stations and are to be subjected to bit-level muting whereby the PDSCH REs are allocated a number of bits less than the number of bits allocated to normal REs which are not to be muted, based on the RRM measurement and the subframes which comprise physical resource blocks having a plurality of REs and CRS RE locations sent from the multiple CoMP base stations, and deciding muted bit positions of the PDSCH REs to be muted; and wherein if the base station is one of the multiple CoMP base stations, the CoMP base station comprises:

a CoMP base station X2 interface to receive the bit-level muting information from the associated base station; and a controller to embed dummy bits in the muted bit positions of the PDSCH REs and transmit, simultaneously with other CoMP base stations, CoMP downlink data with the bit-level muting to the CoMP user equipment.

9. The base station according to claim 8,
wherein the CRS RE locations in the physical resource blocks of the subframes sent from the multiple CoMP base stations are different so that the PDSCH REs include one or more sets of multiple PDSCH REs, the multiple PDSCH REs in each set carrying same data symbol at different RE locations after the bit-level muting or puncturing and before combination of the subframes of the multiple CoMP base stations, and becoming repeated PDSCH REs carrying same information bits after combination of the subframes of the multiple CoMP base stations; and wherein the bit LLRs for bits from the repeated PDSCH REs are added up together to obtain overall bit LLRs for the repeated PDSCH REs in each set.

10. The base station according to claim 8,
wherein if the base station is the associated base station, the controller is configured to allocate to the PDSCH REs a number of bits less than the number of bits allocated to normal REs according to a K-bit bitmap for each PDSCH RE, and to decide the K-bit bitmap identifying one or more bit positions to be muted in each PDSCH RE, the number of bits allocated to an PDSCH RE being less than the number of bits allocated to a normal RE by a difference equal to the number of bit positions to be muted for the PDSCH RE.

11. The base station according to claim 8,
wherein if the base station is one of the CoMP base stations, the CoMP base station is configured, before assigning dummy bits to the muted bit positions, to perform encoding and rate matching on a bit sequence containing the bits in the PDSCH REs, and, after assigning the dummy bits to the muted bit positions and before transferring the data with the bit-level muting of the PDSCH REs to the CoMP user equipment, to perform modulation and PDSCH resource mapping on the bit sequence so that each PDSCH RE accommodates one modulated symbol.

12. A coordinated multipoint (CoMP) user equipment in a communications system which includes the CoMP user equipment and a plurality of base stations, one of the base stations being an associated base station of the CoMP user equipment to transmit data to the CoMP user equipment, the plurality of base stations including multiple CoMP base stations for the CoMP user equipment, the CoMP user equipment comprising:

a radio resource management (RRM) module to perform RRM measurement on received reference signal (RS) strength for each base station of one or more other base stations in a surrounding area of the user equipment other than the associated base station; and an interface to receive CoMP downlink data from the multiple CoMP base stations for the CoMP user equipment, including subframes which comprise physical resource blocks having a plurality of resource elements (REs) and cell-specific reference signal (CRS) resource element (RE) locations;

wherein PDSCH (Physical Downlink Shared Channel) bit-level muting or puncturing information is determined, based on the RRM measurement and the subframes which comprise physical resource blocks having a plurality of REs and CRS RE locations sent from the multiple CoMP base stations, to identify PDSCH REs that suffer strong CRS interference transmission from within the multiple CoMP base stations and are to be subjected to one of (i) bit-level muting whereby the PDSCH REs are allocated a number of bits less than the number of bits allocated to normal REs which are not to be muted and data with the bit-level muting is transferred to the CoMP user equipment, or (ii) bit-level puncturing whereby bit Log-Likelihood ratios (LLRs) corresponding to some bits in the PDSCH REs are punctured or discarded from the data received by the CoMP user equipment from the associated base station;

wherein if the bit-level muting is used, the interface of the CoMP user equipment receives, from the associated base station, the bit-level muting information which includes the PDSCH REs to be subjected to bit-level muting and allocation to the PDSCH REs a number of bits less than the number of bits allocated to normal REs which are not to be muted;

wherein if the bit-level puncturing is used, the CoMP user equipment further comprises a bit-level PDSCH puncturing module to determine the bit-level puncturing information which includes the PDSCH REs to be subjected to bit-level puncturing;

wherein if the bit-level muting is used, the bit-level muting information includes a K-bit bitmap for each PDSCH RE used to allocate to the PDSCH REs a number of bits less than the number of bits allocated to normal REs; the K-bit bitmap identifies one or more bit positions to be muted in each PDSCH RE, the number of bits allocated to an PDSCH RE being less than the number of bits allocated to a normal RE by a difference equal to the number of bit positions to be muted for the PDSCH RE; the dummy bits are added to the muted bit positions of each PDSCH RE in the data with the bit-level muting of the PDSCH REs received by the CoMP user equipment via the interface from the multiple CoMP base stations; and the CoMP user equipment comprises a baseband processor to remove the dummy bits based on the bit-level muting information received from the associated base station.

13. A coordinated multipoint (CoMP) user equipment in a communications system which includes the CoMP user equipment and a plurality of base stations, one of the base stations being an associated base station of the CoMP user equipment to transmit data to the CoMP user equipment, the plurality of base stations including multiple CoMP base stations for the CoMP user equipment, the CoMP user equipment comprising:

a radio resource management (RRM) module to perform RRM measurement on received reference signal (RS) strength for each base station of one or more other base stations in a surrounding area of the user equipment other than the associated base station; and an interface to receive CoMP downlink data from the multiple CoMP base stations for the CoMP user equipment, including subframes which comprise physical resource blocks having a plurality of resource elements (REs) and cell-specific reference signal (CRS) resource element (RE) locations;

wherein PDSCH (Physical Downlink Shared Channel) bit-level muting or puncturing information is determined, based on the RRM measurement and the subframes which comprise physical resource blocks having a plurality of REs and CRS RE locations sent from the multiple CoMP base stations, to identify PDSCH REs that suffer strong CRS interference transmission from within the multiple CoMP base stations and are to be subjected to one of (i) bit-level muting whereby the PDSCH REs are allocated a number of bits less than the number of bits allocated to normal REs which are not to be muted and data with the bit-level muting is transferred to the CoMP user equipment, or (ii) bit-level puncturing whereby bit Log-Likelihood ratios (LLRs) corresponding to some bits in the PDSCH REs are punctured or discarded from the data received by the CoMP user equipment from the associated base station;

wherein if the bit-level muting is used, the interface of the CoMP user equipment receives, from the associated base station, the bit-level muting information which includes the PDSCH REs to be subjected to bit-level muting and allocation to the PDSCH REs a number of bits less than the number of bits allocated to normal REs which are not to be muted;

wherein if the bit-level puncturing is used, the CoMP user equipment further comprises a bit-level PDSCH puncturing module to determine the bit-level puncturing information which includes the PDSCH REs to be subjected to bit-level puncturing; and wherein if the bit-level muting is used,
the data received includes PDSCH REs, each PDSCH RE accommodating one modulated symbol;
the baseband processor is configured, before removing the dummy bits, to demap the received PDSCH REs to a modulated symbol stream and to demodulate the modulated symbol stream to a bit sequence; and
the baseband processor is configured, after removing the dummy bits from the bit sequence, to perform rate dematching and decoding on the bit sequence.

14. A coordinated multipoint (CoMP) user equipment in a communications system which includes the CoMP user equipment and a plurality of base stations, one of the base stations being an associated base station of the CoMP user equipment to transmit data to the CoMP user equipment, the plurality of base stations including multiple CoMP base stations for the CoMP user equipment, the CoMP user equipment comprising:

a radio resource management (RRM) module to perform RRM measurement on received reference signal (RS) strength for each base station of one or more other base stations in a surrounding area of the user equipment other than the associated base station; and an interface to receive CoMP downlink data from the multiple CoMP base stations for the CoMP user equipment, including subframes which comprise physical resource blocks having a plurality of resource elements (REs) and cell-specific reference signal (CRS) resource element (RE) locations;

wherein PDSCH (Physical Downlink Shared Channel) bit-level muting or puncturing information is determined, based on the RRM measurement and the subframes which comprise physical resource blocks having a plurality of REs and CRS RE locations sent from the multiple CoMP base stations, to identify PDSCH REs that suffer strong CRS interference transmission from within the multiple CoMP base stations and are to be subjected to one of (i) bit-level muting whereby the PDSCH REs are allocated a number of bits less than the number of bits allocated to normal REs which are not to be muted and data with the bit-level muting is transferred to the CoMP user equipment, or (ii) bit-level puncturing whereby bit Log-Likelihood ratios (LLRs) corresponding to some bits in the PDSCH REs are punctured or discarded from the data received by the CoMP user equipment from the associated base station;

wherein if the bit-level muting is used, the interface of the CoMP user equipment receives, from the associated base station, the bit-level muting information which includes the PDSCH REs to be subjected to bit-level muting and allocation to the PDSCH REs a number of bits less than the number of bits allocated to normal REs which are not to be muted;

wherein if the bit-level puncturing is used, the CoMP user equipment further comprises a bit-level PDSCH puncturing module to determine the bit-level puncturing information which includes the PDSCH REs to be subjected to bit-level puncturing; and wherein if the bit-level puncturing is used, the bit-level PDSCH puncturing module manages bit-level PDSCH puncturing information which includes a K-bit bitmap for each PDSCH RE used to allocate to the PDSCH REs a number of bits less than the number of bits allocated to normal REs; and the K-bit bitmap identifies one or more bit positions to be punctured in each PDSCH RE, the number of bits allocated to an PDSCH RE being less than the number of bits allocated to a normal RE by a difference equal to the number of bit positions to be punctured for the PDSCH RE.

15. The CoMP user equipment of claim 14, further comprising, if the bit-level puncturing is used:

a baseband processor to remove punctured bits at the punctured bit positions of each PDSCH RE in the data received.

16. The CoMP user equipment of claim 15, wherein if the PDSCH REs all have a same number of bits to be punctured, the baseband processor is configured to remove the same number of punctured bits from the PDSCH REs, which includes discarding equal number of bit LLRs from the PDSCH REs; and wherein if the PDSCH REs have different numbers of bits to be punctured, the baseband processor is configured to remove different numbers of punctured bits from the PDSCH REs, which includes discarding unequal number of bit LLRs from the PDSCH REs.

17. The CoMP user equipment of claim 15, wherein each PDSCH RE accommodates one modulated symbol;

wherein the baseband processor is configured, before removing the punctured bits, to demap the received PDSCH REs to a modulated symbol stream and to demodulate the modulated symbol stream to a bit sequence; and wherein the baseband processor is configured, after removing the punctured bits from the bit sequence, to perform rate dematching and decoding on the bit sequence.

18. The CoMP user equipment of claim 17, further comprising:

a CRS interference cancellation module to perform CRS interference cancellation on the data received before the baseband processor demaps the received PDSCH REs to a modulated symbol stream.

* * * * *